No. 692,267. Patented Feb. 4, 1902.
C. GLOVER & N. W. HASKINS.
WHEEL HUB BRAKE.
(Application filed Nov. 15, 1901.)

(No Model.)

Witnesses
Frank S. Ober
Robt S Allyn

Inventors
Charles Glover,
Naaman W. Haskins
By their Attorney

UNITED STATES PATENT OFFICE.

CHARLES GLOVER, OF NEW BRITAIN, CONNECTICUT, AND NAAMAN W. HASKINS, OF BROOKLYN, NEW YORK, ASSIGNORS TO P. & F. CORBIN, OF NEW BRITAIN, CONNECTICUT, A CORPORATION OF CONNECTICUT.

WHEEL-HUB BRAKE.

SPECIFICATION forming part of Letters Patent No. 692,267, dated February 4, 1902.

Application filed November 15, 1901. Serial No. 82,422. (No model.)

*To all whom it may concern:*

Be it known that we, CHARLES GLOVER, residing at New Britain, Hartford county, Connecticut, and NAAMAN W. HASKINS, residing at Brooklyn, Kings county, New York, citizens of the United States, have invented certain new and useful Improvements in Wheel-Hub Brakes, of which the following is a full, clear, and exact description.

Our invention relates to brake mechanism for vehicles.

The particular kind of brake mechanism to which this invention is more closely related is that type in which the brake-shoe acts against the hub or on an extension of the hub of a driving-wheel.

In some respects this invention embodies the features shown and described in the former application of Charles Glover, one of the applicants herein, Serial No. 64,097, filed June 11, 1901.

The object of this invention is to provide a simple, inexpensive, effective, durable, and efficient means for transmitting power to the brake in such a manner that the friction thereof may be applied gradually and smoothly.

Figure 1:
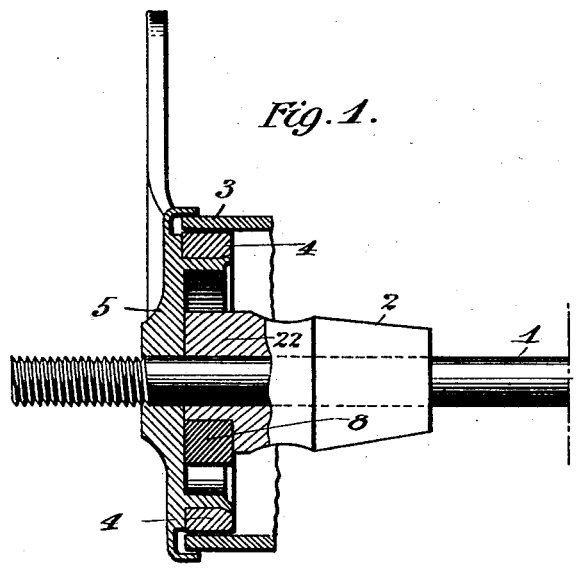
Figure 2:
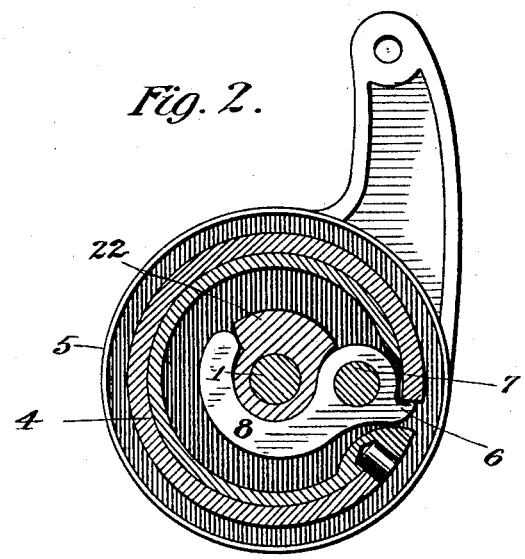

In the drawings, Figure 1 is a sectional view and elevation of a portion of a wheel-hub and axle fitted with our improved brake mechanism. Fig. 2 is an end elevation of the parts shown in Fig. 1, looking from right to left, the view being taken partly in section and the hub-wheel being removed.

1 is an axle. 2 is a brake-actuator mounted thereon, by the turn of which in one direction or the other the brake is applied or released.

3 is a wheel-hub or a flanged extension thereof. Within the hub 3 is located a brake-shoe 4 of the split-ring type.

5 is a frame stationary relatively to the wheel-hub 3. The brake band or shoe 4 is anchored at one end to the frame 5 in any suitable manner. Bearing against the other end of the brake-shoe is the short end 6 of a lever, which is pivoted at 7 eccentrically to the axle 1.

The brake-actuator 2 is provided with a cam extension 22, one end of which takes up against that portion of the lever which is pivoted at 7, while the other end of the said cam bears against a hooked extension 8 of said lever. The hooked extension 8 is an arm considerably longer than the short arm 6, in that it extends around and the brake-actuator to the side thereof opposite the pivotal bearing 7. The cam 22 on the brake-actuator is of a size which approximately fills the space between the extremity of the hooked arm 8 and that portion of the lever mounted upon the pin 7.

The split ring 4 is preferably made of suitable spring metal that normally contracts to such a diameter that it will not engage with the flange 3 of the wheel-hub. In Fig. 2 the parts are shown in their normal position, in which it will be seen that the portion of the lever 6 adjacent the pivotal support 7 acts as a stop to limit the rearward swing of the cam 22.

In applying the brake the brake-actuator is turned in a direction opposite to the hands of a clock, (in the particular form shown,) so that the cam 22 will by bearing against the end of the lever 8 swing said lever and expand the ring 4 until it bears against or frictionally engages the flange 3 on the wheel-hub. In the preferable arrangement of the parts the driving-wheel is adapted to rotate clockwise when the vehicle is going forward, so that the normal action of the wheel is not to expand the ring 7 by frictionally engaging with the free end thereof. Consequently there is no danger of the brake being applied too quickly or becoming jammed. The length of the arm 8 of the lever and its position relatively to the brake-actuator is such that the power is applied with the greatest efficiency.

What we claim is—

1. A wheel-brake, comprising, a brake-shoe, a lever, a fulcrum therefor, one end of said lever being substantially shorter than the other end and bearing against said shoe, a brake-actuator, a portion thereof engaging the longer arm of said lever as said actuator is moved in one direction, another portion of said actuator engaging said lever close to said fulcrum when said actuator is moved in a reverse direction.

2. A wheel-brake, comprising, a split ring anchored at one end, a lever, a fulcrum therefor, one end of said lever being shorter than the other and bearing against the free end of said split ring, a brake-actuator, a portion thereof engaging the longer arm of said lever as said actuator is moved in one direction, and another portion of said actuator engaging said lever close to said fulcrum when said actuator is moved in a reverse direction.

3. In a device of the character described, an axle, a revoluble brake-actuator concentric therewith, a brake-shoe, a lever, a fulcrum therefor, said fulcrum being located to one side of said axle and brake-actuator, one end of said lever bearing against the brake-shoe, the opposite end of said lever extending around said brake-actuator and engaging the same on the side opposite the fulcrum for the lever.

Signed at New Britain, Connecticut, this 12th day of November, 1901.

CHARLES GLOVER.

Witnesses:
A. H. GAMERDINGER,
C. W. GRISWOLD.

Signed at New York, N. Y., this 14th day of November, 1901.

NAAMAN W. HASKINS.

Witnesses:
ROBT. S. ALLYN,
L. VREELAND.